(12) United States Patent
Nishiyama

(10) Patent No.: US 12,535,386 B2
(45) Date of Patent: Jan. 27, 2026

(54) TIRE WEAR CONDITION PREDICTION SYSTEM, TIRE WEAR CONDITION PREDICTION PROGRAM AND TIRE WEAR CONDITION PREDICTION METHOD

(71) Applicant: BRIDGESTONE CORPORATION, Tokyo (JP)

(72) Inventor: Kenta Nishiyama, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 415 days.

(21) Appl. No.: 18/035,853

(22) PCT Filed: Nov. 4, 2021

(86) PCT No.: PCT/JP2021/040648
§ 371 (c)(1),
(2) Date: May 8, 2023

(87) PCT Pub. No.: WO2022/102516
PCT Pub. Date: May 19, 2022

(65) Prior Publication Data
US 2023/0393024 A1    Dec. 7, 2023

(30) Foreign Application Priority Data
Nov. 13, 2020  (JP) .................... 2020-189449

(51) Int. Cl.
*G01M 17/02* (2006.01)
(52) U.S. Cl.
CPC .................... *G01M 17/02* (2013.01)
(58) Field of Classification Search
None
See application file for complete search history.

(56) References Cited

U.S. PATENT DOCUMENTS

| 2010/0186492 A1 | 7/2010 | Morinaga |
| 2018/0154707 A1 | 6/2018 | Sing et al. |
| 2018/0304703 A1 | 10/2018 | Kimura |

FOREIGN PATENT DOCUMENTS

| JP | 2013-136297 A | 7/2013 |
| JP | 2020-164127 A | 10/2020 |
| WO | 2009/008502 A1 | 1/2009 |
| WO | 2017/082362 A1 | 5/2017 |

OTHER PUBLICATIONS

International Search Report for PCT/JP2021/040648 dated Dec. 28, 2021 (PCT/ISA/210).

*Primary Examiner* — Lisa M Caputo
*Assistant Examiner* — Cynthia L Davis
(74) *Attorney, Agent, or Firm* — Sughrue Mion, PLLC

(57) ABSTRACT

Provided with a sensor unit; a strain signal acquisition unit configured to acquire a strain signal; an index calculation unit configured to calculate an index of deformation rate; a relation value calculation unit configured to calculate in advance a relation value between the index of the deformation rate and a wear degree of the tire; a wear condition estimation unit-configured to estimate the wear degree of the tire by comparing the relation value with the index of the deformation rate; and a relation value prediction unit configured to predict a relation value of a tire of another size, and the relation value prediction unit uses data related to at least a thickness of a tire tread portion, which is stored in advance in a data storage unit, when predicting the relation value of the tire of another size.

6 Claims, 8 Drawing Sheets

|  | SIZE | NUMBER OF BELTS |
|---|---|---|
| TR10 | •225/80R17.5 | 3 |
| TR11 | •245/70R19.5 | 4 |
| TR12 | •11R22.5 | 4 |
| TR13 | •385/65R22.5 | 4 |
| TR14 | •445/50R22.5 | 4 |
| TR15 | •285/75R24.5 | 4 |

(a)

(b)

(a)

(b)

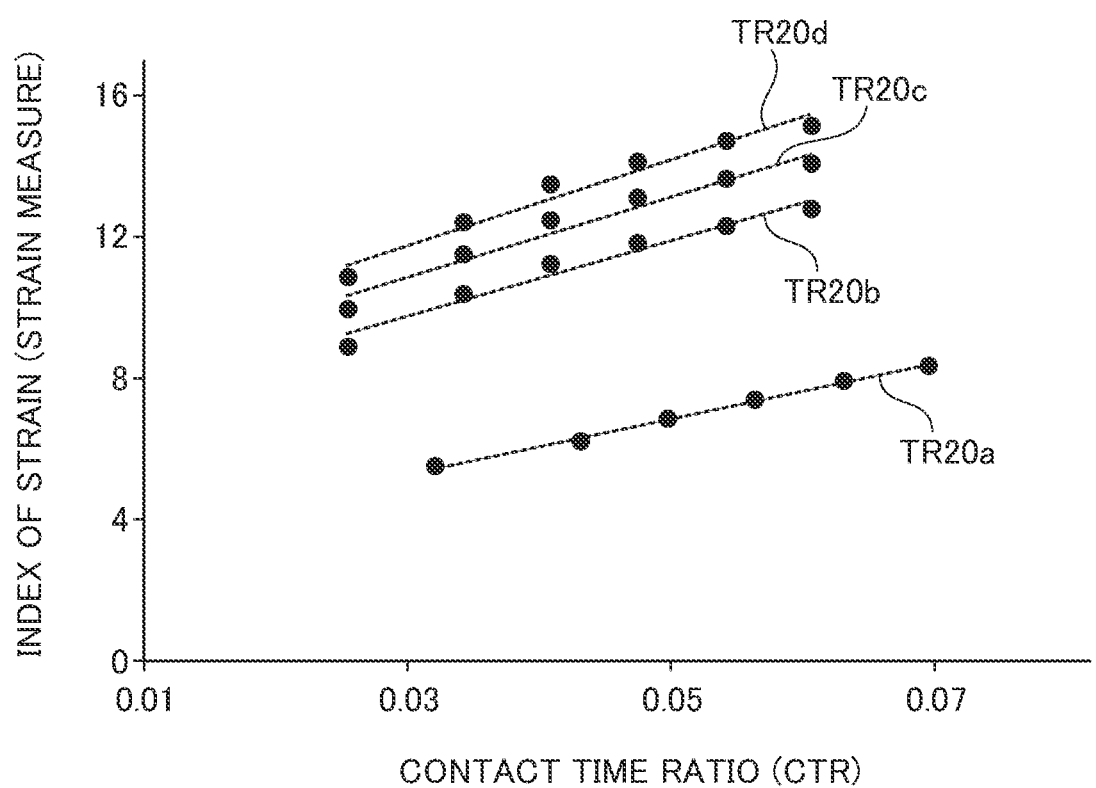

TIRE WEAR CONDITION PREDICTION SYSTEM, TIRE WEAR CONDITION PREDICTION PROGRAM AND TIRE WEAR CONDITION PREDICTION METHOD

CROSS REFERENCE TO RELATED APPLICATIONS

This application is a National Stage of International Application No. PCT/JP2021/040648 filed Nov. 4, 2021, claiming priority based on Japanese Patent Application No. 2020-189449 filed Nov. 13, 2020.

TECHNICAL FIELD

The present embodiment relates to a tire wear condition prediction system, a tire wear condition prediction program and a tire wear condition prediction method.

BACKGROUND ART

In the past, a technique has been proposed in which an acceleration sensor is provided on a pneumatic tire (hereinafter referred to as a tire) to estimate (predict) tire wear based on the detected acceleration (Patent Literature 1).

In the wear estimation technique using such an acceleration sensor, for example, an index of deformation rate which is obtained by differentiating the detected radial acceleration and obtaining a peak (also called wear measure) has been used, and a residual groove amount of a tire has been estimated by using a regression equation, using the principle that an index value of this deformation rate increases as wear progresses.

CITATION LIST

Patent Literature

Patent Literature 1: WO2009/008502

SUMMARY OF THE INVENTION

However, in the wear estimation technique using an acceleration sensor, there has been a problem that it is difficult to obtain data in the low-speed range because the magnitude of an acceleration signal depends on the rotational speed of a tire.

For this reason, a wear estimation technique using a strain sensor has been proposed as an alternative to an acceleration sensor.

However, in predicting tire wear, the technique using an acceleration sensor and the technique using a strain sensor have a common problem that "it is very expensive to implement parameter learning that requires experiments for each type of tire".

Meanwhile, the advantage of using a strain sensor lies in that there is almost no speed dependence.

The disadvantage of using a strain sensor lies in that it is difficult to make a correction because the strain sensor is affected by the inner surface thickness of a tire. For this reason, there has been a problem that it is difficult to adapt the technique of tire size generalization in tire wear prediction using a conventional acceleration sensor to tire wear prediction using a strain sensor.

The present invention has been made in view of the above problem, and an object of the present invention is to provide a tire wear condition prediction system, a tire wear condition prediction program, and a tire wear condition prediction method that use a strain sensor and are capable of predicting high-accuracy wear conditions at low cost even for tires that do not have learning data.

A tire wear condition prediction system according to an aspect of the present invention includes: a sensor unit provided on an inner side surface of a tire or inside the tire and including a strain sensor configured to detect strain in the tire; a strain signal acquisition unit configured to acquire a strain signal that is output from the strain sensor; an index calculation unit configured to calculate an index of deformation rate based on a time-series waveform of the acquired strain signal; a relation value calculation unit configured to calculate in advance a relation value between the index of the deformation rate and a wear degree of the tire; a wear condition estimation unit configured to estimate the wear degree of the tire by comparing the relation value with the index of the deformation rate; and a relation value prediction unit configured to predict, based on the relation value between the index of the deformation rate of the tire and the wear degree of the tire, a relation value of a tire of another size, and the relation value prediction unit uses data related to at least a thickness of a tire tread portion, which is stored in advance in a data storage unit, when predicting the relation value of the tire of another size.

This configuration makes it possible to predict wear conditions with high accuracy for tires of other sizes at low cost.

Further, the data related to the thickness of the tire tread portion may include data of a radial thickness from an inner surface of a tire to a belt provided in the tire.

This makes it possible to predict wear conditions with high accuracy even when the strain increases with an increase in the inner surface thickness of the tire.

A tire wear condition prediction program according to another aspect of the present invention is a tire wear condition prediction program executed by a computer included in a tire wear condition prediction system, and the program includes: a strain signal acquisition step of acquiring a strain signal that is output from a strain sensor provided on an inner side surface of a tire or inside the tire; an index calculation step of calculating an index of deformation rate based on a time-series waveform of the acquired strain signal; a relation value calculation step of calculating in advance a relation value between the index of the deformation rate and a wear degree of the tire; a wear condition estimation step of estimating the wear degree of the tire by comparing the relation value with the index of the deformation rate; and a relation value prediction step of predicting, based on the relation value between the index of the deformation rate of the tire and the wear degree of the tire, a relation value of a tire of another size, and in the relation value prediction step, data related to at least a thickness of a tire tread portion is used when predicting the relation value of the tire of another size.

This configuration makes it possible to predict wear conditions with high accuracy for tires of other sizes at low cost.

Further, the data related to the thickness of the tire tread portion may include data of a radial thickness from an inner surface of a tire to a belt provided in the tire.

This makes it possible to predict wear conditions with high accuracy even when the strain increases with an increase in the inner surface thickness of the tire.

A tire wear condition prediction program according to another aspect of the present invention includes: a strain signal acquisition process of acquiring a strain signal that is output from a strain sensor provided on an inner side surface of a tire or inside the tire; an index calculation process of calculating an index of deformation rate based on a time-series waveform of the acquired strain signal; a relation value calculation process of calculating in advance a relation value between the index of the deformation rate and a wear degree of the tire; a wear condition estimation process of estimating the wear degree of the tire by comparing the relation value with the index of the deformation rate; and a relation value prediction process of predicting, based on the relation value between the index of the deformation rate of the tire and the wear degree of the tire, a relation value of a tire of another size, and in the relation value prediction process, data related to at least a thickness of a tire tread portion is used when predicting the relation value of the tire of another size.

This configuration makes it possible to predict wear conditions with high accuracy for tires of other sizes at low cost.

Further, the data related to the thickness of the tire tread portion may include data of a radial thickness from an inner surface of a tire to a belt provided in the tire.

This makes it possible to predict wear conditions with high accuracy even when the strain increases with an increase in the inner surface thickness of the tire.

The present embodiment makes it possible to provide a tire wear condition prediction system, a tire wear condition prediction program, and a tire wear condition prediction method that use a strain sensor and are capable of predicting high-accuracy wear conditions at low cost even for tires that do not have learning data.

BRIEF DESCRIPTION OF THE DRAWINGS

FIG. 10 is a graph illustrating a relation between an index of strain (strain measure) and a contact time ratio (CTR) for a tire.

DESCRIPTION OF EMBODIMENTS

Figure 1:
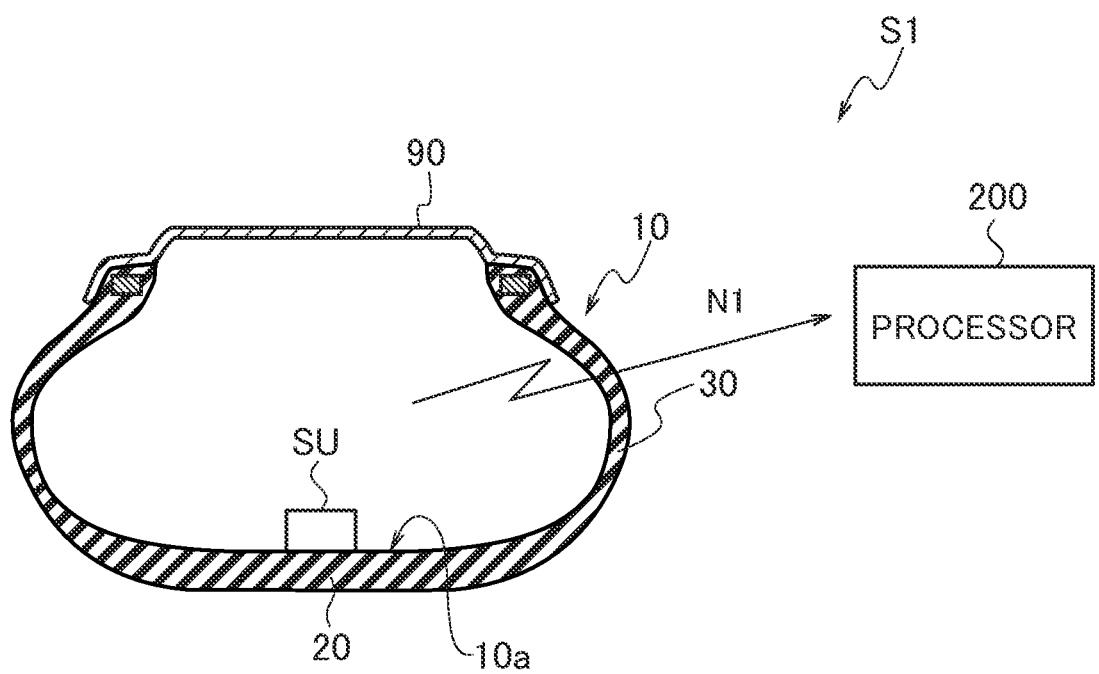
FIG. 1 is a schematic configuration diagram illustrating a schematic configuration of a tire wear condition prediction system according to an embodiment.

A tire wear condition prediction system S1 according to an embodiment of the present invention will be described with reference to FIGS. 1 and 2.

Note that the same or similar portions are denoted by the same or similar reference numerals in the following descriptions of the drawings. It should be noted however that the drawings are schematic and ratios of dimensions and the like are different from the actual ones.

Accordingly, specific dimensions and the like should be determined in consideration of the following descriptions. Moreover, the drawings include parts showing dimensional relations and ratios that are different from each other, as a matter of course.

(Schematic Configuration of Tire Wear Condition Prediction System)

A schematic configuration of a tire wear condition prediction system S1 according to an embodiment will be described with reference to a schematic configuration diagram of FIG. 1.

The tire wear condition prediction system S1 includes a sensor unit SU provided on a pneumatic tire 10 side (hereafter referred to simply as a tire) and a processor 200 (in-vehicle unit (ECU) or the like) which processes information acquired from the sensor unit SU via a wireless line N1.

FIG. 1 illustrates a cross-sectional shape along a tire width direction of a tire 10 assembled on a rim wheel 90.

A tread portion 20 is a portion where the tire 10 attached to a vehicle (not illustrated) comes into contact with a road surface when rolling on the road surface. A tread pattern is formed in the tread portion 20 according to the type of vehicle and the required performance.

The sensor unit SU provided with a strain sensor SN for detecting the strain of the tire 10 is provided on an inner surface 10a of the tire 10 to which the tire wear condition prediction system S1 can be applied. Although not directly related to the present embodiment, the sensor unit SU may be capable of acquiring temperature information and the like in addition to strain information.

In the configuration example illustrated in FIG. 1, the sensor unit SU is provided on the inner surface 10a facing the tread portion 20. More specifically, the sensor unit SU is attached to the surface of an inner liner (not illustrated) that prevents leakage of gases such as air filled in the internal space of the pneumatic tire 10 assembled to the rim wheel 90.

The sensor unit SU is preferably provided on each tire 10 attached to the vehicle. This is because it is desirable to monitor the wear condition of each tire 10 so as to ensure the safety of the vehicle.

In addition, the sensor unit SU need not necessarily be attached to the inner surface of the tire 10. For example, a part or all of the sensor units SU may be embedded inside the tire 10.

(Functional Configuration of Tire Wear Condition Prediction System)

Figure 2:
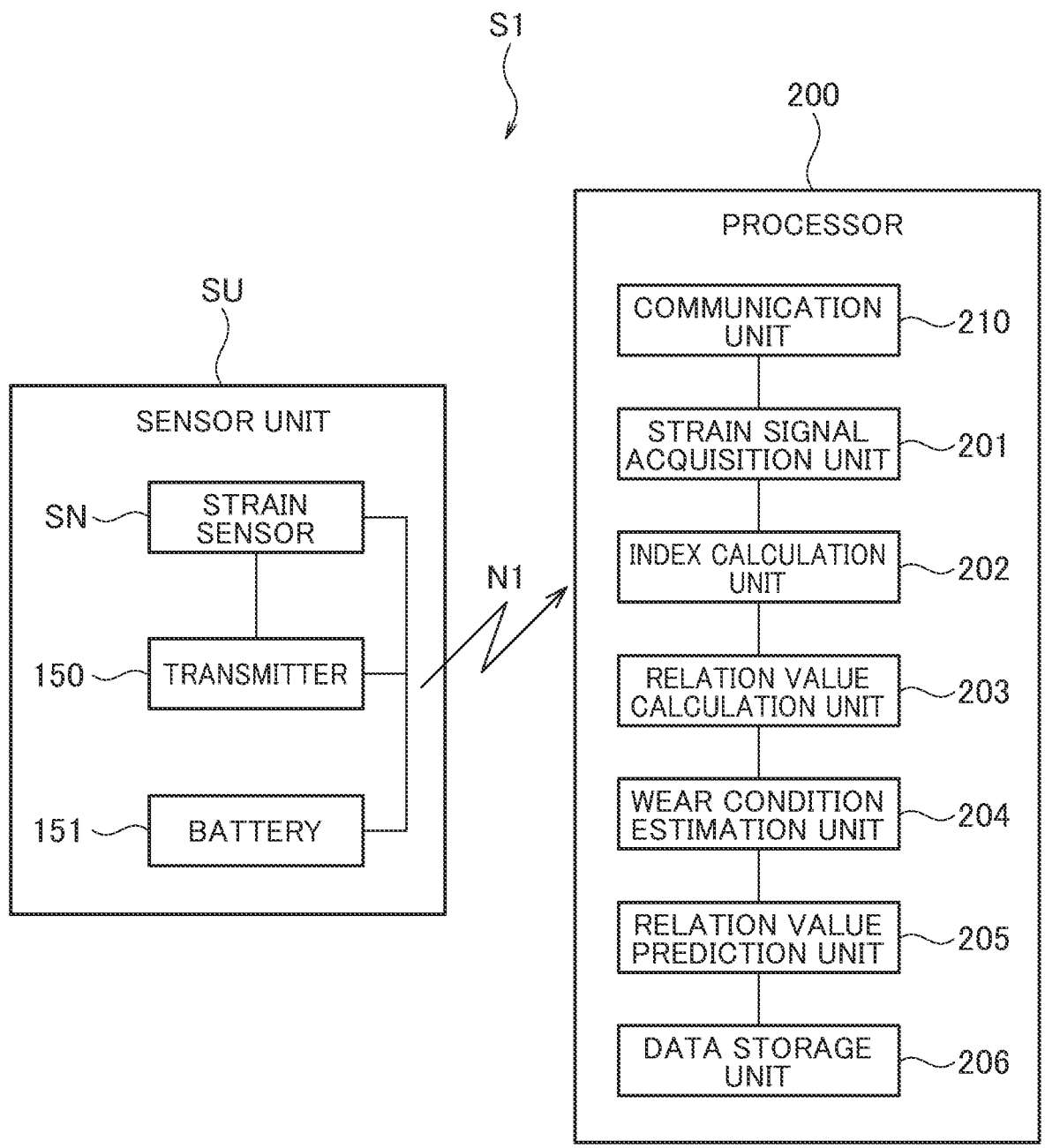
FIG. 2 is a functional block diagram illustrating a functional configuration of the tire wear condition prediction system according to the embodiment.

As illustrated in the functional block diagram of FIG. 2, the sensor unit SU includes the strain sensor SN which detects strain in the tire 10, a transmitter 150 which transmits detection data to the processor 200, and a battery 151 which feeds the strain sensor SN and the transmitter 150.

Meanwhile, the processor 200 configured of an ECU or the like includes a strain signal acquisition unit 201 which acquires strain signals from the sensor unit SU for every fixed detection period. Communication between the sensor unit SU and the processor 200 is performed between the transmitter 150 on the sensor unit SU side and the communication unit 210 on the processor 200 side via the wireless line N1.

In addition, the processor 200 includes an index calculation unit 202 which calculates an index of deformation rate (wear measure) based on a time-series waveform of the acquired strain signal.

In addition, the processor 200 includes a relation value calculation unit 203 which calculates in advance a relation value between an index of deformation rate and a wear degree of the tire 10.

In addition, the processor 200 includes a wear condition estimation unit 204 that compares the calculated relation value with an index of deformation rate to estimate a wear degree of the tire 10.

In addition, the processor 200 includes a relation value prediction unit 205 which predicts relation values of other tires of different sizes from the tire 10 based on a relation value between an index of deformation rate of the tire 10 and a wear degree of the tire 10.

In addition, the processor 200 includes a data storage unit 206 configured of a nonvolatile memory or the like for storing data related to a thickness of a tire tread portion in advance for a plurality of tires of different sizes.

Further, the relation value prediction unit 205 predicts relation values of the tires of the other sizes using the data related to the thickness of the tire tread portion stored in advance in the data storage unit 206.

A specific technique for predicting the relation values of the tires of the other sizes will be described later.

This configuration makes it possible to predict high-accuracy wear conditions at low cost for tires of the other sizes in addition to the tire 10. That is, it is possible to predict the wear conditions for a plurality of types of tires without learning parameters which requires experiments for each type of tire having a different inner surface thickness, as in the conventional method.

Also, the data related to a thickness of a tire tread portion may include data related to a radial thickness from the inner surface of the tire 10 to a belt provided in the tire 10.

This makes it possible to predict the wear conditions with high accuracy even when the strain increases with an increase in the inner surface thickness of the tire.

(Tire Wear Condition Prediction Processing)

Figure 3:
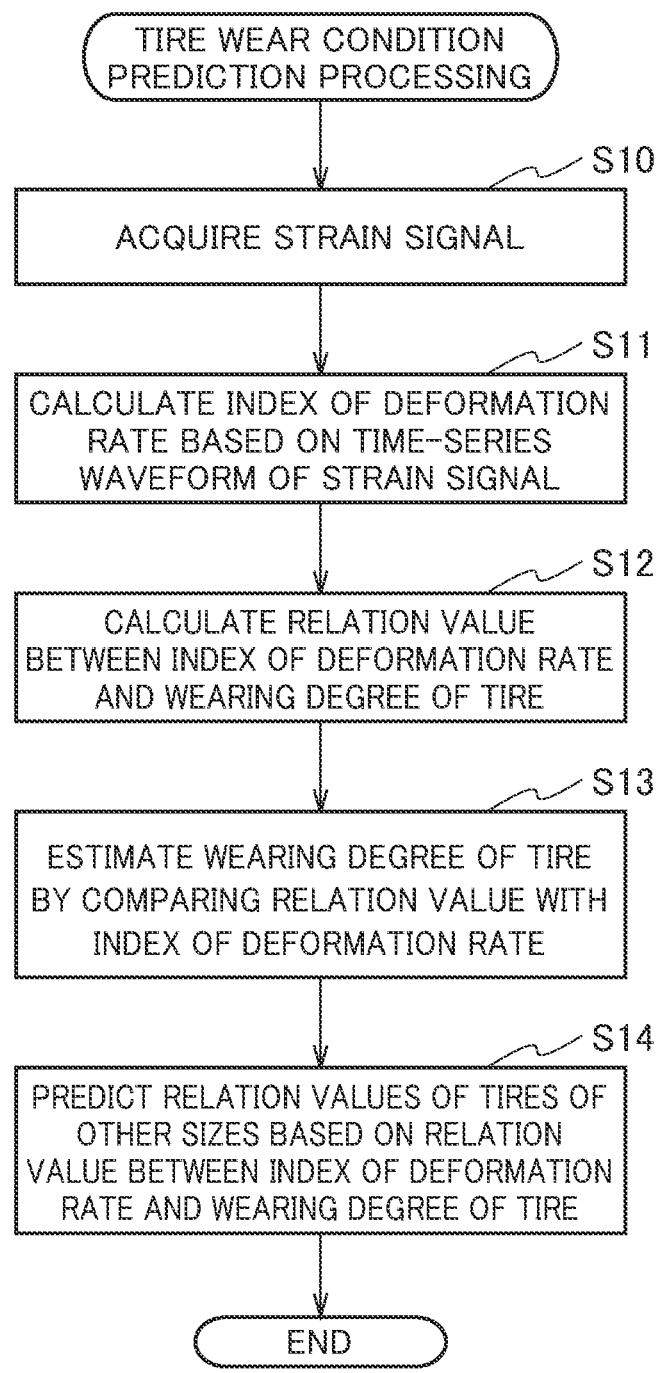
FIG. 3 is a flow chart illustrating a processing procedure of tire wear condition prediction processing according to the embodiment.

With reference to the flowchart illustrated in FIG. 3, the processing procedure of the tire wear condition prediction processing executed in the tire wear condition prediction system S1 will be described.

The processing procedure can be realized by cooperation between an OS (operating system) provided in the processor 200 or the like and a prescribed application program. However, some or all of each procedure may be implemented in hardware.

When the processing has started, the strain signal acquisition unit 201 acquires a strain signal that is output from the strain sensor SN of the sensor unit SU in step S10, and the processing moves to step S11.

In step S11, an index of deformation rate (wear measure) is calculated based on the time-series waveform of the acquired strain signal, and the processing moves to step S12.

In step S12, a relation value between the index of deformation rate (wear measure) and the wear degree of the tire 10 is calculated, and the processing moves to step S13.

In step S13, the wear degree of the tire 10 is estimated by comparing the calculated relation value with the index of deformation rate (wear measure), and the processing moves to step S14.

In step S14, the relation values of the tires of the other sizes are predicted based on the relation value between the index of deformation rate of the tire 10 (wear measure) and the wear degree of the tire 10, and the processing ends.

Here, when predicting the relation values of the tires of the other sizes, the data related to a thickness of a tire tread portion, which is stored in advance in the data storage unit 206, is used.

The data related to the thickness of the tire tread portion may include data related to a radial thickness from the inner surface of the tire 10 to a belt provided in the tire 10.

(Algorithm for Tire Wear Condition Prediction)

Here, an algorithm applied to the tire wear condition prediction according to the present invention will be described.

In the present invention, an algorithm equivalent to the one disclosed in the patent applications filed by the present applicant (JP Unexamined Patent Application Publication No. 2009-018667, WO 2009/008502, etc.) will be used as a basic algorithm for predicting tire wear conditions using a strain sensor.

The algorithm disclosed in the above patent applications relates to wear predictions using an acceleration sensor provided in a tire, and is a machine learning model whose main feature amount is a peak value detected after differentiating a radial acceleration (wear major value) and a contact time ratio (CTR). Please see the descriptions in the above patent applications for more details.

Meanwhile, "strain" used in the present invention is one axis in the tire circumferential direction (tangential direction).

Figure 4:
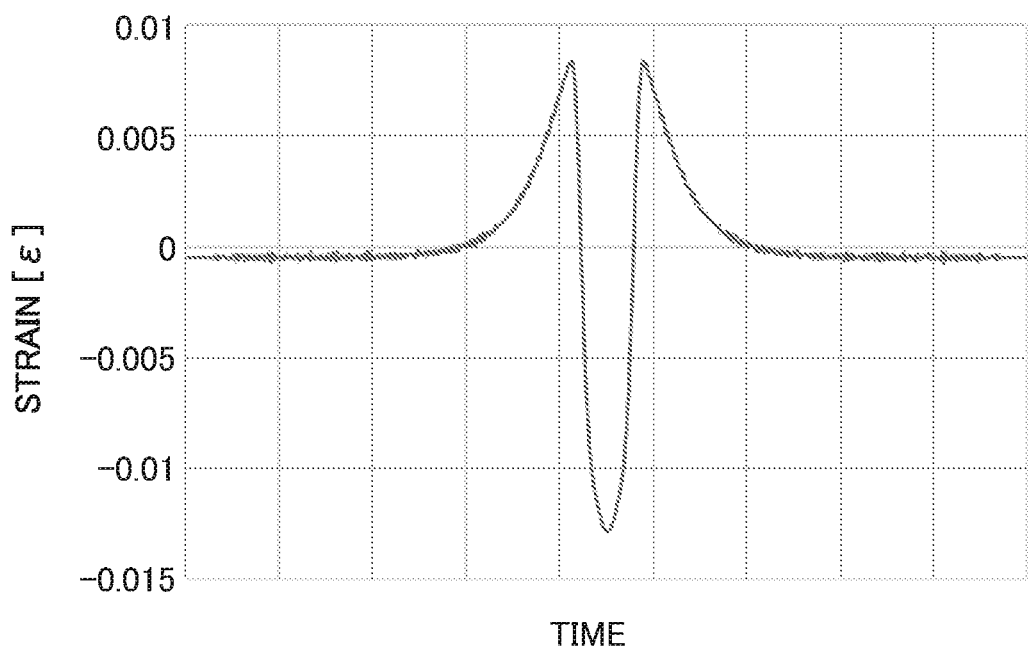
FIG. 4 is a graph illustrating a relation between strain and time for a tire.
Figure 5:
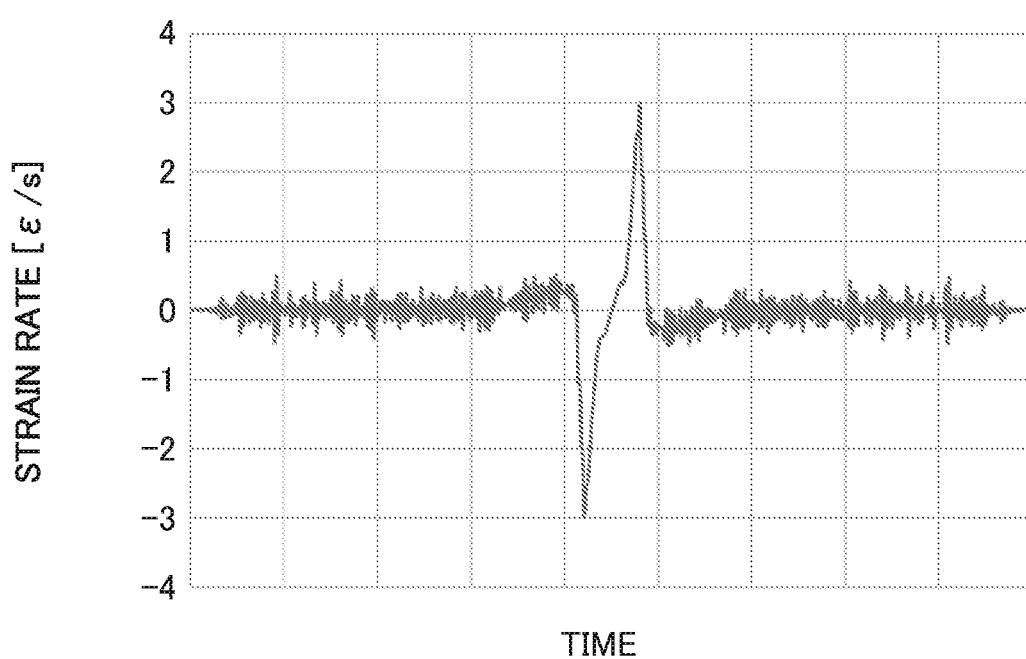
FIG. 5 is a graph illustrating a relation between strain rate and time for a tire.

Here, an example of strain in the circumferential direction is illustrated in the graph of FIG. 4, and an example of a differential waveform is illustrated in the graph of FIG. 5.

Each of FIGS. 4 and 5 illustrates a waveform obtained by FEM (finite element method).

In addition, in the FEM analysis in the present embodiment, a tire of size "11R22.5 M801" is used as a sample, and the detected "strain" is the strain of a tire inner liner.

Here, the WM (wear measure) is defined by the following equation:

$$WM = DP \times ORT \times CL$$

DP (derivative peak) is a peak value of a differential waveform, and may be an absolute value of a tread side or a kick side, or an aggregation of such absolute values such as an average.

ORT (one rotational time) indicates the time of one rotation of a tire, and CL (circumferential length) indicates the circumferential length of a tire.

In the CL, a tire radius can be replaced with a value indicating a size such as a diameter, and the CL is determined from the design specifications.

The ORT cancels speed dependency and the CL cancels tire diameter dependency.

The CTR is obtained by dividing an elapsed time from a tread peak to a kick peak of a differential waveform by the ORT, and is a typical index indicative of load.

Figures 6, 7:
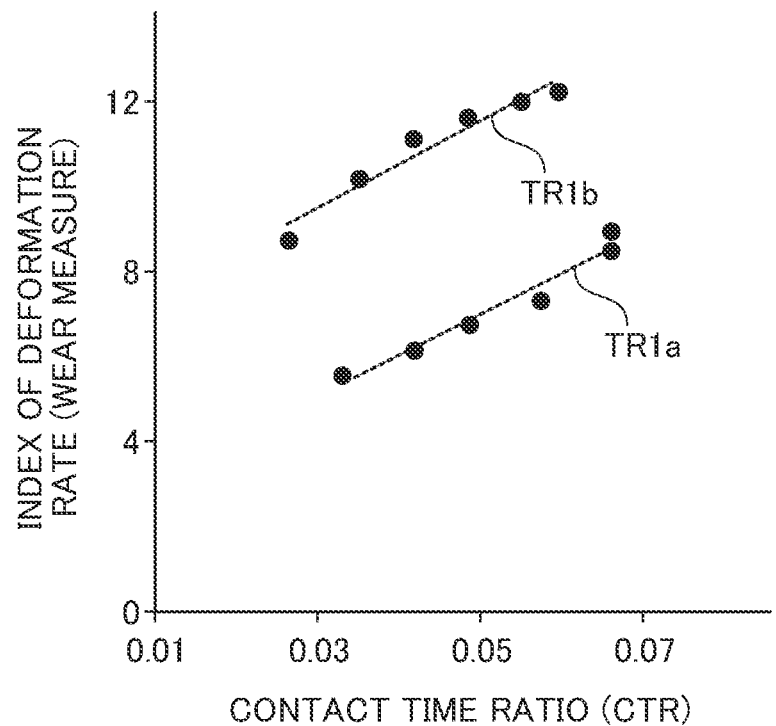
FIG. 6 is a graph illustrating a relation between an index of deformation rate (wear measure) and a contact time ratio (CTR) for a tire.
FIG. 7 is a diagram illustrating specifications of tires of several sizes.

The graph in FIG. 6 illustrates a relation between the CTR and the WM (wear measure: an index of deformation rate) for a new tire TR1$a$ and a fully worn tire TR1$b$.

As can be seen by referring to the graph in FIG. 6, a clear distinction can be made between the new tire TR1$a$ and the fully worn tire TR1$b$.

In addition, a residual groove amount (RTD) using the following regression equation can be estimated by adding the TPMS (tire pressure monitoring system) information.

$$RTD = f(WM, \text{temperature, air pressure, speed, etc.})$$

(Correction Method Using Acceleration Sensor and Problem Using Acceleration Sensor)

In the wear prediction using an acceleration sensor, the following equation (Equation 1) was used to estimate the wear measure of a tire.

$$WM = f\left(CTR, D, \frac{W}{D}, \frac{2H}{D}\right) \quad \text{[Equation 1]}$$

Here, D represents a tire diameter, W represents a tire width, and H represents a cross-section height.

The correction made by the tire diameter D is a correction to be made with respect to being averaged according to the size of a sensor. Accordingly, the data used as sample data is the coordinates and deformation behavior of the tire inner surface, and the effect of D can be ignored because there is no physical size of the sensor.

Then, under the condition that the CTR was fixed at 0.04, a correlation coefficient of acceleration was obtained as R2=0.967 and a correlation coefficient of strain was obtained as R2=0.677.

As sample data, as illustrated in FIG. 7, the data for six types of tires from TR10 to TR15 was used such that the entirety was covered by the diameters, flatness ratios, and so on to some extent.

From the above correlation coefficients, the correlation coefficient was very high in the case of acceleration, and it was possible to predict the wear measure values with high accuracy by using this correction model.

In contrast, in the case of strain, the correlation coefficient is low, and it is considered that the accuracy deteriorates with a size correction algorithm equivalent to that of the acceleration sensor.

For this reason, a new correction method is required for the tire wear condition prediction using the strain sensor SN according to the present embodiment.

(Correction by Inner Surface Thickness of Tire)

In the case of the strain sensor SN, it is greatly affected by the thickness of rubber on an inner surface of a tire, and thus it is necessary to make a correction for this.

Figure 8:
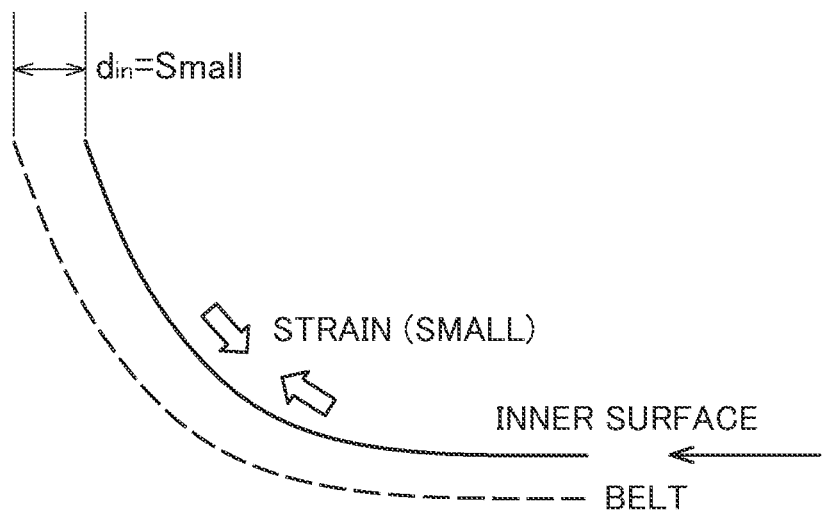
FIG. 8 at (a) is a schematic diagram illustrating the effect of an inner surface thickness of a tire on strain (when relatively thin), and FIG. 8 at (b) is a schematic diagram illustrating a strain distribution.
Figure 8:
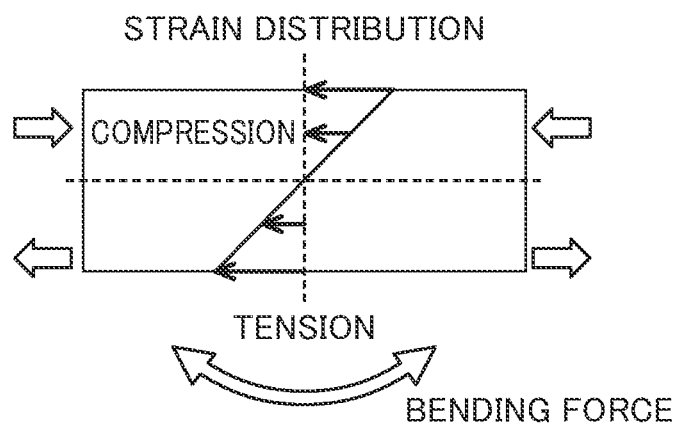
Figure 9:
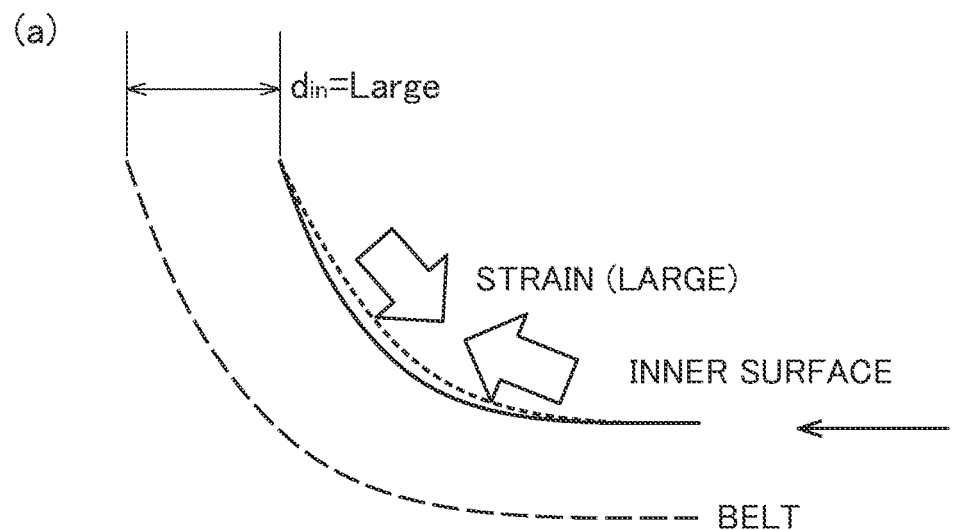
FIG. 9 at (a) is a schematic diagram illustrating the effect of an inner surface thickness of a tire on strain (when relatively thick), and FIG. 9 at (b) is a schematic diagram illustrating a strain distribution.
Figure 9:
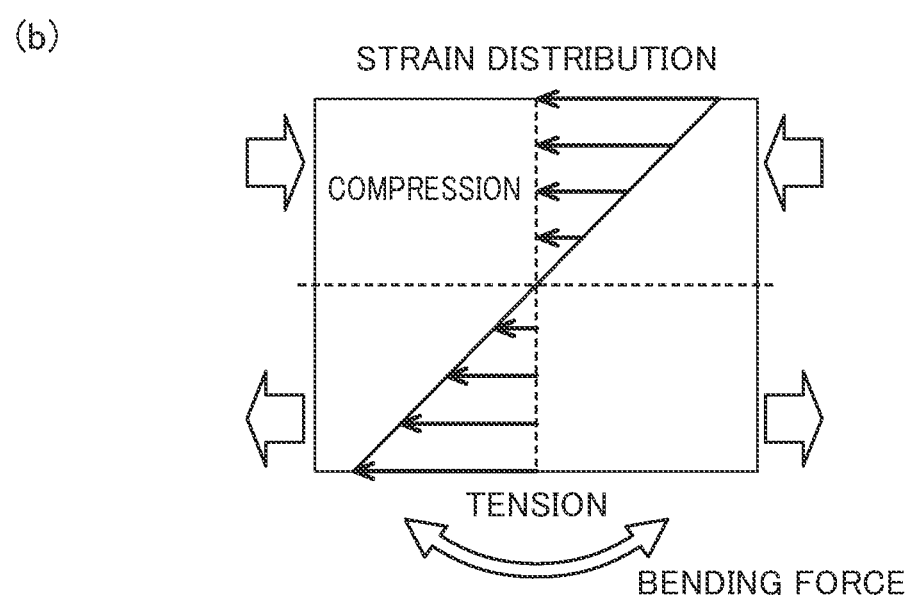

FIG. 8 at (a) is a schematic diagram illustrating the effect of an inner surface thickness of a tire on strain (when relatively thin), FIG. 8 at (b) is a schematic diagram illustrating a strain distribution, FIG. 9 at (a) is a schematic diagram illustrating the effect of an inner surface thickness of a tire on strain (when relatively thick), and FIG. 9 at (b) is a schematic diagram illustrating a strain distribution.

First, most of the tire's tension is supported by a belt, and the force, that is, the deformation generated in the belt determines most of the mechanical behavior of the whole tire.

Now assume that a certain bending deformation has been generated in the belt.

As can be seen from (a) and (b) of FIG. 8, when the inner surface is thin (d in=Small), the compressive strain generated on the inner liner surface is small.

In contrast, as can be seen from (a) and (b) of FIG. 9, when the inner surface is thick (d in=Large), it is inferred that the compressive strain is large.

Accordingly, it can be inferred that the strain increases as the inner surface thickness increases.

Here, the FEM was used to investigate the effect of a change in the inner surface thickness on the wear measure. Specifically, in the model of the fully worn product using the FEM, three types of tires of different inner-liner thicknesses were prepared and analyzed: the tire according to a design value (TR20b), the tire 1 mm thicker than a designed value (TR20c), and the tire 2 mm thicker than a designed value (TR20d) (see FIG. 10).

In the graph of FIG. 10, TR20a indicates the analysis result of the unused (brand-new) tire according to a design value.

As can be seen from the graph in FIG. 10, as the inner surface thickness increases theoretically, the strain is amplified, and thus the wear measure values increase.

Meanwhile, when an acceleration sensor is used, the wear measure values are determined by the shape of the profile of the inner surface of the tire (almost the same as the profile of the belt), and thus although the values are affected by a change of the profile due to a slight increase in the inner surface thickness, it is considered that there is no significant difference.

In consideration of the above investigation, it was found that when using the strain sensor SN, it is necessary to add a correction due to the inner surface thickness of the tire.

(Estimation Equation of Wear Measure Value)

In consideration of the above investigation results, the wear measure value when the tire is fully worn is estimated using the following equation (Equation 2).

$$WM = f\left(CTR, D, \frac{W}{D}, \frac{2H}{D}, d_{in}\right) \quad \text{[Equation 2]}$$

Here, "d in" represents an inner surface thickness.

In addition to making a correction using the equation (Equation 2), the correction using TPMS data may be made.

The function of the equation (Equation 2) can be a simple linear multiple regression or a nonlinear function.

(Procedure for Wear Prediction)

The procedure for actually predicting tire wear is as follows:

(1) Model Learning Stage

First, experiments are conducted with six types of fully worn tires mentioned above (see FIG. 7) as test tires, and the relations among WM, CTR, D and d in are learnt.

(2) Parameter Acquisition Stage of New Tire

For tires without learning data, the relation between WM, and CTR and TPMS data is obtained at the early driving stage in which the tires are not worn.

(3) Estimation of Residual Groove Amount

WM, CTR, TPMS data and the like are measured.

In predicting the relation in the sizes of the other tires, design information such as D: tire diameter, W: tire width and H: tire cross-section height may be used in addition to d in: inner structural thickness of tire.

Then, based on the CTR, the TPMS data and the design information data, the wear measure at the time of a new tire is calculated and the wear measure at the time of a fully worn tire is calculated.

The residual groove amount is calculated by determining what level the measured WM is positioned with respect to the new wear measure and the fully worn wear measure.

As described above, the tire wear condition prediction system S1 according to the present embodiment makes it possible to accurately predict the difference between the tire sizes at a low cost, because it becomes unnecessary to actually measure "a relation between an index of deformation rate and a degree of tire wear" for the respective tires having a plurality of specifications (such as size) in the wear prediction using the strain sensor SN.

The tire wear estimation system, the tire wear estimation program and the tire wear estimation method of the present invention have been described based on the illustrated embodiment; however, the present invention is not limited to the present embodiment, and the configuration of each component may possibly be replaced by any other configurations having equivalent functions.

For example, if operating conditions such as a power supply (battery) 151 are satisfied, some of the processing functions of the processor 200 in the present embodiment may be mounted in the sensor unit SU.

EXPLANATION OF THE REFERENCE NUMERALS

S1 Tire wear condition prediction system
SU Sensor unit
SN Strain sensor
200 Processor
201 Strain signal acquisition unit
202 Index calculation unit
203 Relation value calculation unit
204 Wear condition estimation unit
205 Relation value prediction unit

The invention claimed is:

1. A tire wear condition prediction system comprising:
a sensor unit provided on an inner side surface of a subject tire or inside the subject tire and including a strain sensor configured to detect strain in the subject tire;
a strain signal acquisition unit configured to acquire a strain signal that is output from the strain sensor;
an index calculation unit configured to calculate an index of deformation rate based on a time-series waveform of the acquired strain signal;
a relation value calculation unit configured to calculate in advance a relation value between the index of the deformation rate and a wear degree of the subject tire;
a wear condition estimation unit configured to estimate the wear degree of the subject tire by comparing the relation value with the index of the deformation rate; and
a relation value prediction unit configured to predict, based on the relation value between the index of the deformation rate of the subject tire and the wear degree of the subject tire, a relation value of another tire having a different size; wherein
the relation value prediction unit uses data related to at least a thickness of a tire tread portion of the subject tire and the other tire, which is stored in advance in a data storage unit, when predicting the relation value of the other tire having a different size.

2. The tire wear condition prediction system according to claim 1, wherein
the data related to the thickness of the tire tread portion includes data of a radial thickness from an inner surface of a tire to a belt provided in the tire.

3. A non-transitory computer readable medium storing a tire wear condition prediction program executed by a computer included in a tire wear condition prediction system, the program comprising:

a strain signal acquisition step of acquiring a strain signal that is output from a strain sensor provided on an inner side surface of a subject tire or inside the subject tire;
an index calculation step of calculating an index of deformation rate based on a time-series waveform of the acquired strain signal;
a relation value calculation step of calculating in advance a relation value between the index of the deformation rate and a wear degree of the subject tire;
a wear condition estimation step of estimating the wear degree of the subject tire by comparing the relation value with the index of the deformation rate; and
a relation value prediction step of predicting, based on the relation value between the index of the deformation rate of the subject tire and the wear degree of the subject tire, a relation value of another tire having a different size, wherein
in the relation value prediction step, data related to at least a thickness of a tire tread portion of the subject tire and the other tire is used when predicting the relation value of the other tire having a different size.

4. The non-transitory computer readable medium storing the tire wear condition prediction program according to claim 3, wherein
the data related to the thickness of the tire tread portion includes data of a radial thickness from an inner surface of a tire to a belt provided in the tire.

5. A tire wear condition prediction method, the method comprising:
a strain signal acquisition process of acquiring a strain signal that is output from a strain sensor provided on an inner side surface of a subject tire or inside the subject tire;
an index calculation process of calculating an index of deformation rate based on a time-series waveform of the acquired strain signal;
a relation value calculation process of calculating in advance a relation value between the index of the deformation rate and a wear degree of the subject tire;
a wear condition estimation process of estimating the wear degree of the subject tire by comparing the relation value with the index of the deformation rate; and
a relation value prediction process of predicting, based on the relation value between the index of the deformation rate of the subject tire and the wear degree of the subject tire, a relation value of another tire having a different size, wherein
in the relation value prediction process, data related to at least a thickness of a tire tread portion of the subject tire and the other tire is used when predicting the relation value of the other tire having a different size.

6. The tire wear condition prediction method according to claim 5, wherein
the data related to the thickness of the tire tread portion includes data of a radial thickness from an inner surface of a tire to a belt provided in the tire.

* * * * *